Patented Nov. 25, 1952

2,619,479

UNITED STATES PATENT OFFICE 2,619,479

RADICAL STABILIZED POLYMERS

David M. McQueen, Wilmington, Del., assignor to E. I. du Pont de Nemours and Company, Wilmington, Del., a corporation of Delaware No Drawing. Application December 28, 1950, Serial No. 203,211

9 Claims. (Cl. 260—45.9)

This invention relates to the stabilization of polymeric organic materials which tend to deteriorate in storage or use due to the deleterious effects of heat, light, and/or oxidizing conditions.

Various organic polymers have achieved wide usage in recent years in textiles, rubber, and molded plastics which are subject to exposure, either during or after fabrication, to elevated temperatures and in the presence of oxygen. Deterioration in physical properties, such as embrittlement and loss of strength, generally occurs with most polymeric materials. Exposure of many polymers to light results in discoloration. Exposure of the polymer to heat and light is generally believed to accelerate oxidation of the polymer and for this reason antioxidants such as aromatic amines and hydroquinone have sometimes been used to increase the stability and useful life of polymers for various applications. However, the conventional antioxidants show little or no effect as stabilizers for many polymers and it is possible that oxidation is not always involved in the deterioration of organic polymers.

This invention has as an object the preservation of organic polymeric materials from deterioration ordinarily experienced by them. A further object is the preparation of compositions containing organic polymeric materials fortified against deterioration. Other objects will appear hereinafter.

These objects are accomplished by compositions containing an organic polymeric material and an organic nitrogen compound which is stable at 20° C., unreactive with oxygen at 20° C. and has a magnetic susceptibility at 20° C. of between about $500 \times 10^{-6}$ and $3400 \times 10^{-6}$ E. M. U. and preferably from $1100 \times 10^{-6}$ E. M. U. to $1500 \times 10^{-6}$ E. M. U. per mol in the solid state.

Organic compounds may be classified by their behavior in a magnetic field. The majority of organic materials are repelled by a magnetic field, i. e., when placed in a magnetic field tend to be driven from a stronger field to a weaker field, and are said to be diamagnetic. In such compositions all of the valence electrons are paired. A relatively small number of organic compounds when placed in a magnetic field are attracted, or tend to be drawn into the strongest part of the field. Such compounds are paramagnetic and the extent of attraction or intensity of magnetization is proportional to the number of odd or unpaired electrons in the compound.

A very simple method of measuring the magnetic susceptibility is by placing the sample in a magnetic field (between the poles of a magnet, preferably an electromagnet). The sample is suspended from a sensitive balance and its weight determined. When the field is applied, the sample will be attracted or repelled by the field, depending on its susceptibility, and a change on the observed weight of the sample will be noted in the balance. Under usual conditions the change in weight is only a few milligrams and the equipment should have a sensitivity substantially equivalent to that of a good analytical balance to obtain accurate results. This and other procedures for the determination of magnetic susceptibility are relatively simple and are further explained in Selwood, Magnetochemistry, Interscience Publishers, N. Y., 1943; Waters, Chemistry of Free Radicals, Oxford, 1946 (particularly pages 25–31) and Bhatnagar and Mathur, Physical Principles and Applications of Magnetochemistry, Macmillan, London, 1935. Magnetic susceptibility as determined by the weight change of a sample suspended between the poles of an electromagnet (Gouy balance) is the ratio of intensity of magnetization inside the substance to the intensity of the applied magnetic field. From a measure of the force which acts on the specimen, the magnetic susceptibility may be calculated and is usually expressed in electromagnetic units (E. M. U. per mol).

The organic compounds which are used to stabilize organic materials against the deleterious effects of heat, light and oxidation are nitrogen-containing monomeric organic compounds which have a magnetic susceptibility at 20° C. of between about $500 \times 10^{-6}$ and $3400 \times 10^{-6}$ E. M. U. and preferably from $1100 \times 10^{-6}$ E. M. U. to $1500 \times 10^{-6}$ E. M. U. per mol in the solid state and which generally have a molecular weight of the order of 140 to 500 or even higher. The preferred compounds are the nitroxides, hydrazyls and phenazyls and they are employed generally in amounts of 0.001 to about 2% by weight of the organic polymer to effect stabilization.

These compounds are mixed with the polymeric material by any suitable method, such as from suitable solvents or by milling or other mechanical operations.

The following examples in which parts are by weight are illustrative of the invention.

EXAMPLE I

A piece of nylon taffeta weighing 2.3 parts woven from delusterant-free nylon yarn was placed in a dispersion of 0.23 part of 1,1-dimethyl-3-(N-phenyloximino) butyl phenyl nitroxide, 0.5 part of soap and 150 parts of water. The dispersion was then heated to 75–80° C. for one hour with agitation. At the end of this time the nylon was colored a pale yellow. It was removed from the solution, rinsed, and dried. A second piece of taffeta was given the same treatment with the exception that the nitroxide was omitted from the soap bath. Fibers were obtained from each of these samples by unraveling the cloth along one edge. These fibers were tested for tensile strength. Both samples were exposed in the Fade-Ometer and strands of fibers taken after each 20 hours' exposure for tensile strength measurements. The loss in tensile strength of both samples during exposure is shown in the following table which clearly demonstrates the superiority of the treated nylon over the control. After 200 hours, the treated sample has 2.1 g. p. d. in tensile strength as compared to only 1.2 g. p. d. in the untreated sample.

| Hrs. exposed in the Fade-Ometer | Tensile Strength in Grams per Denier | | Percent Loss in Tensile Strength | |
|---|---|---|---|---|
| | Treated Sample | Control Sample | Treated Sample | Control |
| 0 | 5.62 | 6.14 | | |
| 20 | 5.36 | 5.57 | 4.6 | 9.3 |
| 40 | 5.16 | 5.48 | 8.2 | 10.8 |
| 60 | 5.19 | 5.33 | 7.7 | 13.2 |
| 80 | 4.97 | 4.62 | 11.6 | 24.8 |
| 100 | 4.36 | 4.64 | 22.4 | 24.4 |
| 120 | 4.04 | 3.91 | 28.2 | 36.4 |
| 140 | 3.76 | 3.12 | 33.0 | 49.2 |
| 160 | 3.19 | 1.92 | 43.2 | 69.0 |
| 180 | 2.45 | 1.40 | 56.4 | 77.1 |
| 200 | 2.13 | 1.12 | 62.0 | 82.0 |

EXAMPLE II

Films about .0005 inch thick molded of high-viscosity nylon were immersed in 16 parts of methanol containing 1.25% by weight of 2,2-diphenyl-1-picrylhydrazyl. The mixture was stirred at the reflux temperature for one hour and was then allowed to stand at room temperature for 17 hours. The films were then removed, washed three times with methanol, and dried.

Samples of the 2,2-diphenyl-1-picrylhydrazyl treated film, untreated control films, and controls which were treated with methanol as described above except for omission of the hydrazyl, were heated in a forced-air oven at 140° C. The samples were removed at intervals of about 20 hours (oftener during the first 20 hours), cooled, and tested for embrittlement by folding double between thumb and forefinger. After four hours heating, both the untreated films and the control films treated with methanol alone were partially embrittled (failed on some bends), and after seven hours total heating they were completely embrittled (broke on every bend). The film treated with 2,2-diphenyl-1-picrylhydrazyl was embrittled only after 228 hours heating at 140° C.

Other examples showing the stabilization of nylon to heat embrittlement are given in the following table. The films were treated exactly as described above except that for the 2,2-diphenyl-1-picrylhydrazyl there was substituted an equal weight of the compound listed in the left-hand column, and the samples were refluxed for one-half hour and allowed to stand 17 hours in the methanol mixture; because of the shorter treatment, less of the stablizer was incorporated and the embrittlement times are accordingly diminished. Samples were cooled in a desiccator at 0% relative humidity.

| Stabilizer | Hours at 140° C. to embrittlement | |
|---|---|---|
| | Partial | Complete |
| 2,2-Diphenyl-1-picrylhydrazyl | 100 | 140 |
| Diphenylamino picryl nitroxide | 220 | 260 |
| N-Diphenylamino-N-picrylhydroxylamine | 180 | 180 |
| N-Ethylphenazyl | 100 | 100 |
| Sodium salt of 1,1-diphenyl-2-(2,4-dinitro-6-sulfophenyl) hydrazine | 380 | 440 |

EXAMPLE III

A delustered nylon (0.3% TiO$_2$) taffeta fabric about 3 x 12" weighing two parts was immersed in 79 parts of methanol containing one part of 1,1-dimethyl-3-(N-phenyloximino) butyl phenyl nitroxide, heated at the reflux temperature for one-half hour and then allowed to stand at room temperature for 17 hours. The fabric was then removed, rinsed with methanol, and dried. It was colored a pale yellow. A similar piece was treated in the same way except that the nitroxide was omitted.

Samples of these fabrics were exposed to ultraviolet light in the Fade-Ometer, and fibers were removed at intervals of 20 hours exposure for physical testing. The sample which had been treated with 1,1-diphenyl-3-(N-phenyloximino)-butyl phenyl nitroxide showed consistently higher tenacity after the first 20 hours, and at 100 hours had lost only 40% of the tenacity prior to treatment, while the sample treated with methanol only had lost 53% of the original tenacity.

EXAMPLE IV

A delustered nylon (0.3% TiO$_2$) taffeta fabric about 3 x 12" weighing two parts was immersed in 79 parts of methanol containing one part of 2,2-diphenyl-1-picrylhydrazyl, refluxed for one-half hour and then allowed to stand at room temperature for 17 hours. The fabric was removed, rinsed with methanol and dried. It was dyed a reddish brown. A similar piece was treated the same way except that the hydrazyl was omitted.

Samples of these fabrics were heated in a forced-air oven at 125° C. and fibers were removed at intervals for testing. The sample treated with 2,2-diphenyl-1-picrylhydrazyl retained its tenacity better than the control, and at 220 hours had lost only 15% of the tenacity of the untreated fabric, while the control had lost 28% of the original tenacity.

EXAMPLE V

Nylon fabrics (super bright nylon taffeta) was scoured with standard soap solution and portions of the fabric additionally treated with 2,2-diphenyl-1-picrylhydrazyl. The hydrazyl was applied to 8 parts of fabric from a dispersion of 0.4 part of the hydrazyl, and 1.0 part "Ivory" soap made up to 3000 parts by weight with water. The treated and untreated samples of fabric were heated for various lengths of time in a forced-draft oven at 125° C. At given intervals samples were removed, fibers separated from the fabric and the tenacity of these fibres determined. The following table summarizes the results.

| | Hours at 125° C. | Tenacity, g. p. d. | | Tenacity loss, percent | |
|---|---|---|---|---|---|
| | | Untreated | Treated | Untreated | Treated |
| 1 | 0 | 5.7 | 5.3 | | |
| 2 | 5 | 5.49 | 5.49 | 3.7 | 3.7 |
| 3 | 24 | 5.35 | 5.36 | 6.2 | 6.0 |
| 4 | 93 | 4.76 | 5.06 | 16.5 | 11.2 |
| 5 | 117 | 3.67 | 4.60 | 35.6 | 19.3 |
| 6 | 186 | 3.41 | 4.52 | 40.2 | 20.7 |

EXAMPLE VI

N-ethylphenazyl was prepared as described by McIlwain, J. Chem. Soc. 1937, 1710. Fifty parts of a neoprene (polychloroprene) latex containing approximately 37% solids was diluted with 37.5 parts of water and vigorously agitated (Waring Blendor) while a solution of 0.18 part of N-ethylphenazyl in 4 parts of benzene was added. Strips of rayon fabric were dipped into this emulsion, drained and air-dried overnight. Weights determined on strips before and after treatment showed that they contained 0.37 part of neoprene per part of fabric. The treated strips were heated in an air oven or exposed to ultraviolet light and tested for tensile strength after exposure. The fabric used for these tests had an initial tensile strength of 53 lbs./sq. in. Samples treated as described above had tensile strengths of 55 and 58 lbs./sq. in. after two and four hours at 125° C., and 51 lbs./sq. in. after exposure to ultraviolet light for six hours. Control fabrics prepared as described above, but without added stabilizer, had corresponding values of 5, 3, and 6 lbs./sq. in.

| Stabilizer | Tensile Strengths | | | Solvent if other than $C_6H_6$ |
|---|---|---|---|---|
| | 2 hrs. 125° C. | 4 hrs. 125° C. | 6 hrs. U. V. light | |
| None | 5 | 3 | 6 | |
| N-Ethylphenazyl | 55 | 58 | 51 | |
| Diphenylaminopicryl nitroxide | 46 | 49 | 24 | $CHCl_3$ |
| 1,1-Diphenyl-2-picryl-2-hydroxyhydrazine | 41 | | 16 | $CHCl_3$ |

EXAMPLE VII

The general procedure of Example III was repeated except that a rayon satin fabric having a tensile strength of 158 lbs./sq. in. was used. The following table shows the strengths after various exposures with certain stabilizers.

| Stabilizer | Tensile Strengths | | |
|---|---|---|---|
| | 2 hrs. 125° C. | 4 hrs. 125° C. | 6 hrs. U. V. light |
| None | 32 | 10 | 37 |
| Di-(2, 4, 6-trimethoxyphenyl) nitroxide | 132 | 97 | 63 |
| Di-p-anisyl nitroxide | 157 | 150 | 101 |
| 1,1-Dimethyl-3-(N-p-tolyloximino)-butyl-p-tolyl nitroxide | 161 | 143 | 83 |
| 1,1-Dimethyl-3-(N-m-tolyloximino)-butyl-m-tolyl nitroxide | | 161 | [1] 41 |

[1] After 24 hrs. instead of 6.

EXAMPLE VIII

A polychloroprene latex was prepared as follows:

A solution containing 400 parts chloroprene, 16 parts Nancy wood rosin, and 1.36 dodecyl mercaptan was emulsified at room temperature in a solution containing 628 parts water, 3.8 parts sodium hydroxide, 2.4 parts "Daxad" 11 (formaldehyde/sodium naphthalenesulfonate condensation product), and 2.4 parts potassium persulfate. The emulsion was stirred slowly and heated under a blanket of nitrogen for 1.2 hours at a temperature of 40° C. During this time the specific gravity of the polymer latex rose from 0.98 to 1.045. The polymerization was stopped at this point and the latex divided into four equal portions of 263 parts each. To one portion of the latex was added 0.65 part 1,1-diphenyl-2-picrylhydrazine dissolved in 13.2 parts benzene. To another portion of the latex (263 parts) was added 13 parts of an emulsion prepared by emulsifying a solution containing 0.4 part phenothiazine, 0.4 part p-tertiary butylcatechol, and 70.4 parts benzene in a solution containing 120 parts water, 1.2 parts sodium laurylsulfate, and 0.6 part "Daxad" 11.

The latex containing 1,1-diphenyl-2-picrylhydrazine showed no increase in specific gravity on standing at room temperature for nine days. This indicates that the 1,1-diphenyl-2-picrylhydrazine effectively stopped the polymerization at a conversion of approximately 65%.

The polymer obtained from the latex containing 1,1-diphenyl-2-picrylhydrazine was more stable toward heat and light than the polymer obtained from the latex containing phenothiazine and p-tertiary butylcatechol. Thus, rayon fabrics impregnated with the latex containing 1,1-diphenyl-2-picrylhydrazine and heated for four hours at 125° C., or exposed to ultraviolet light for 13 hours, showed little or no tendering whereas rayon fabrics treated with the polychloroprene latex containing phenothiazine and p-tertiary butylcatechol were severely tendered under these conditions. (The degree of tendering of the rayon is a measure of the amount of HCl evolved when the polymer is heated or exposed to ultraviolet light and thus gives a qualitative indication of the stability of the polymer toward heat and light.)

EXAMPLE IX

A polychloroprene latex (263 parts) was prepared as described in Example IV and stabilized by addition of a solution containing 0.65 part 1,1-diphenyl-2-picrylhydrazyl dissolved in 17.6 parts benzene. This latex showed no increase in specific gravity on standing at room temperature for five days. Rayon fabrics impregnated with the latex and heated for four hours at 125° C. or exposed to ultraviolet light for 7.5 hours showed little or no tendering, while fabrics impregnated with a polychloroprene latex stabilized with phenothiazine and p-tertiary butylcatechol became badly tendered under these conditions.

EXAMPLE X

To 183 parts of a polychloroprene latex containing 10 parts of an emulsion containing phenothiazine and p-tertiary butylcatechol was added a solution containing 0.045 part 1,1-diphenyl-2-picrylhydrazyl dissolved in 4.4 parts benzene. Rayon fabrics impregnated with this latex and heated for four hours at 125° C. were only slightly tendered, while fabrics impregnated with a polychloroprene latex containing only the emulsion of phenothiazine and p-tertiary butylcatechol were severely tendered under these conditions.

EXAMPLE XI

Films of polymerized ethylene were prepared as follows: A 25% solution of ethylene polymer in xylene was obtained by heating to reflux in a glass container. The viscous clear solution was divided into several portions, one of which was retained as a control. To one was added 0.5% (based on the weight of ethylene polymer) of 1,1-dimethyl-3-(N-phenyloximino)-butyl phenyl nitroxide and to another 0.5% of 2,2-diphenyl-1-picrylhydrazyl. The hot solutions were cast at 100–105° C. and heated to 130–135° C. After cooling the films were stripped and placed on outdoor exposure racks. The following table shows the properties of these films after exposure for six months.

| Polymer sample | Tensile Strength (lbs./sq. in.) | Percent Elongation | No. of Flexes at break |
|---|---|---|---|
| Polythene (control) | 1,421 | 119 | 4,328 |
| Polythene+nitroxide | 1,943 | 547 | 9,358 |
| Polythene+hydrazyl | 1,407 | 453 | 21,871 |

EXAMPLE XII

Samples of unmodified polymethyl methacrylate were treated on a rolling mill to effect thorough mixture with the compounds listed in the table below. The stabilizing compounds were employed in equivalent molecular amounts, which, in the case of lauryl mercaptan, was 0.2% by weight of the methacrylate. The following table shows the compound employed and the per cent weight loss of the polymer when it was heated for one-half hour at 260° C. in an atmosphere of nitrogen.

| Compound Tested | Percent Weight Loss |
|---|---|
| (1) Control | 17.8 |
| (2) Lauryl mercaptan | 7.82 |
| (3) Diphenylamino picryl nitroxide | 2.82 |
| (4) 2,2-Diphenyl-1-picryl hydrazyl | 3.55 |
| (5) 1,1-Dimethyl-3(N-phenylamino) butylphenyl nitroxide | 4.03 |
| (6) Di(2,4,6-trimethoxyphenyl) nitroxide | 3.98 |

By the process of this invention organic polymeric materials which are subject to degradation, e. g., loss of strength or similar physical properties due to heat, photo-chemical effects or oxidation are stabilized against the deleterious effects of heat, light, and/or oxygen. Examples of the improvements obtained are the stabilization of naturally occurring polymeric materials such as rubber to heat, light and oxygen. Polymers of vinylidene and vinyl halides, particularly vinyl chloride have increased resistance to heat and light when the small amounts of the organic nitrogen-containing stabilizers as previously defined are incorporated in them. Even vinyl fluoride polymer which is normally considered as a stable polymer has its decomposition temperature elevated by the incorporation of these compounds which have a molar magnetic susceptibility of preferably between 1100 and 1500×10⁻⁶ E. M. U. Other polymeric compounds which are improved by the use of these stabilizers are addition polymers (including copolymers) of ethylene, styrene, vinyl esters, methyl methacrylate, acrylonitrile, alpha-chloroacrylic acid and esters thereof, vinylpyridines, butadiene, ethylene glycol dimethacrylate, diallyl maleate and condensation polymers such as polyhexamethyleneadipamide, polyhexamethylenesebacamide/caprolactam and other nylons, i. e., sinthetic linear polyamides preferably having an average unit length of at least 7 and an intrinsic viscosity of at least 0.4, polyethylene terephthalate, alkanol-modified urea/formaldehyde resins and similar phenol/formaldehyde resins. Thus, the organic polymeric materials applicable include both polymers formed by the addition polymerization of ethylenically unsaturated compounds and condensation polymers such as polyamides, polyesters, etc. Those polymers which are essentially linear are preferred since with such polymers the advantages of the invention are most strikingly evident.

The organic compounds that are used to effect the improvements in stability as previously indicated contain nitrogen, do not react with oxygen at room temperature and have a magnetic susceptibility of at least 500×10⁻⁶ E. M. U. and generally between about 1100×10⁻⁶ and 3400×10⁻⁶ E. M. U. per mol. Magnetic susceptibility is readily measured, e. g., the susceptibility of 1,1-dimethyl-3(N-phenyloximino) butylphenyl nitroxide is about 1203×10⁻⁶ E. M. U. per mol and for 1,1 - dimethyl - 3(N - m - tolyloximino(butyl-m-tolyl nitroxide is 1220×10⁻⁶ E. M. U. per mol. These compounds belong mainly to three classes: nitroxides, hydrazyls, and phenazyls.

Nitroxides which have been employed in the process of this invention include:

*Table of nitroxides*

1,1 - dimethyl - 3(N - phenyloximino) butylphenyl nitroxide,

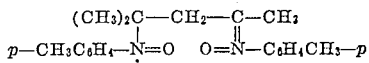

[Banfield, J. Chem. Soc. 1612 (1926)];
1,1-dimethyl-3(N-p-tolyloximino) butyl p-tolyl-nitroxide,

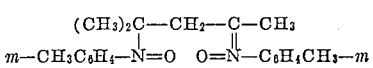

[by the above Banfield method];
1,1 - dimethyl - 3(N - m - tolyloximino) butyl-m-tolyl nitroxide,

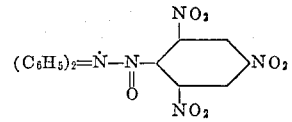

magnetic susceptibility, 1220×10⁻⁶, [by the above Banfield method];
Diphenylamino picryl nitroxide,

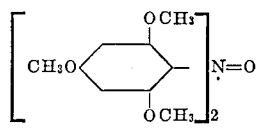

[Goldschmidt, Ber. 55 628–643 (1922)];
Di - (2,4,6 - trimethoxyphenyl) nitroxide,

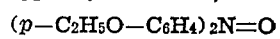

[Meyer and Reppe, Ber. 54 327–377 (1921)];
Di-p-anisyl nitroxide, $(p-CH_3O-C_6H_4)_2N=O$, magnetic susceptibility, 1293×10⁻⁶, [Meyer, Ber. 52 1476–1489 (1919)];
Di-p-ethoxyphenyl nitroxide, $$(p-C_2H_5O-C_6H_4)_2N=O$$

[by the above Meyer method];

Di(2,4-dimethoxyphenyl) nitroxide,

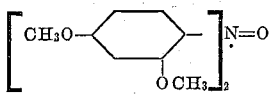

[by the above Meyer and Reppe method];
Di(2,6 - dimethyl - 4 - methoxyphenyl) nitroxide,

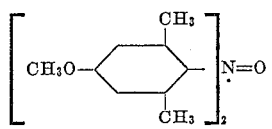

[by the above Meyer and Reppe method];
Di(2,4 - dimethoxy - 6 - methylphenyl) nitroxide,

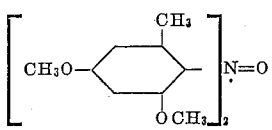

[by the above Meyer and Reppe method];
p-Porphyrexide (5,5 - dimethyl - 2,4 - diimino-1-imidazolidyl-1-oxide),

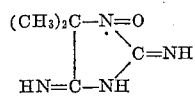

[Piloty, Ber. 34 1879, 2632, 3208 (1901)];
Dichloroporphyrexin (5,5 - dimethyl - 2,4 - di-(N-chloroimino)-1-imidazolidyl-1-oxide),

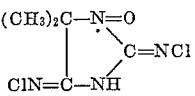

[Piloty, Ber. 34 2358 (1901)];
2,4 - diimino - 1,3 - diazospiro[4,5]-1-decyl-1-oxide,

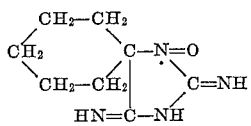

[Porter, J. Am. Chem. Soc. 66 1652 (1944)]; the azine dimer of this diazospiro compound;
Di(p-nitrophenyl) nitroxide,

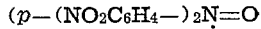

$(p-(NO_2C_6H_4-)_2N=O$ magnetic susceptibility, $1469 \times 10^{-6}$, [Cambi, Gazz. chim. ital. 63 579 (1933)];
Diphenyl nitroxide, $(C_6H_5)_2N=O$, magnetic susceptibility, $1275 \times 10^{-6}$, [Cambi, Gazz. chim. ital. 63 579 (1933)];
The invention is generic to hydrazyls having the required magnetic susceptibility, e. g., 2,2-diphenyl-1-picrylhydrazyl,

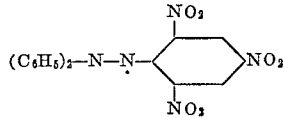

[Goldschmidt, Ber. 55 628 (1922)]; and the corresponding 2,2 - diphenyl - 1 - (2,4-dinitro-6-sulfophenyl) hydrazyl and the phenazyls including N-ethylphenazyl,

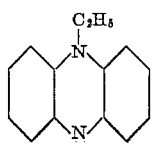

and N-methylphenazyl-2-nitrile,

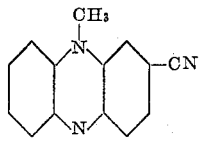

[McIlwain, J. Chem. Soc. 1937, 1701–1711].

The invention is generic to the employment of nitroxides, phenazyls, and hydrazyls having the previously defined range of magnetic susceptibility The nitroxides which contain two to four aromatic nuclei are particularly preferred. As is evident from the formulas given, the compounds have under normal conditions nitrogen which has at least one odd electron. This is otherwise expressed in the paramagnetic nature of the compounds with the previously defined range of magnetic susceptibility.

The amount of nitroxide or other appropriate paramagnetic compound that may be employed to stabilize organic polymeric materials is subject to wide variation. In general the amount based on the weight of polymer is from about 0.001 to 2%. It is preferred to add the nitroxides, hydrazyls or phenazyls as such rather than to prepare these compounds in situ in the polymer.

These nitrogen-containing materials may be mixed with organic polymers by any suitable method, e. g., milling, mixing in mutual solvents, etc. The polymer compositions may be used in the various ways the unstabilized polymer would be used, e. g., in textiles, coated fabrics, films, etc., but of course with greater utility because of its greater stability and freedom from deterioration.

In the specification and claims "polymer" and "polymeric material" are used to denote high polymers, i. e., polymers of very high molecular weight, i. e., macromolecular materials. See Marvel et al. in Gilman's Organic Chemistry (Wiley, New York, 1943), page 702; Fuson et al., Organic Chemistry, Wiley, New York, 1942), page 357; Bawn, The Chemistry of High Polymers (Interscience, New York, 1948), page 1.

The foregoing detailed description has been given for clearness of understanding only and no unnecessary limitations are to be understood therefrom. The invention is not limited to the exact details shown and described for obvious modifications will occur to those skilled in the art.

What is claimed is:
1. A composition comprising a synthetic linear polycarbonamide having the recurring —CONH— groups separated by hydrocarbon chains and, in sufficient amount to retard the heat deterioration thereof, a nitroxide having from two to four aromatic nuclei and having a magnetic susceptibility at 20° C. of about $500-3400 \times 10^{-6}$ E. M. U. per mol.

2. A composition comprising a synthetic linear polycarbonamide having the recurring —CONH— groups separated by hydrocarbon chains and, in sufficient amount to retard the heat deterioration thereof, an organic nitroxide having a magnetic susceptibility at 20° C. of about $500-3400 \times 10^{-6}$ E. M. U. per mol.

3. A composition comprising a synthetic linear polycarbonamide having the recurring —CONH— groups separated by hydrocarbon chains and, in sufficient amount to retard the heat deterioration thereof, an organic nitrogen compound, unreactive with oxygen at room temperature, of magnetic susceptibility between about $500 \times 10^{-6}$ and $3400 \times 10^{-6}$ E. M. U. per mol, and selected from the class consisting of nitroxides, phenazyls, and hydrazyls.

4. A composition comprising a chloroprene polymer and, in sufficient amount to retard deterioration, an organic nitrogen compound, unreactive with oxygen at 20° C., of magnetic susceptibility between about $500 \times 10^{-6}$ and $3400 \times 10^{-6}$ E. M. U. per mol, and selected from the class consisting of nitroxides, phenazyls, and hydrazyls.

5. A composition comprising polymeric ethylene and, in sufficient amount to retard deterioration, and organic nitrogen compound, unreactive with oxygen at 20° C., of magnetic susceptibility between about $500 \times 10^{-6}$ and $3400 \times 10^{-6}$ E. M. U. per mol, and selected from the class consisting of nitroxides, phenazyls, and hydrazyls.

6. A composition comprising an organic polymeric material subject to deterioration and, in sufficient amount to retard such deterioration, an organic hydrazyl of magnetic susceptibility between $500 \times 10^{-6}$ and $3400 \times 10^{-6}$ E. M. U. per mol.

7. A composition comprising an organic polymeric material subject to deterioration and, in sufficient amount to retard such deterioration, an organic nitrogen compound, unreactive with oxygen at 20° C., of magnetic susceptibility between about $500 \times 10^{-6}$ and $3400 \times 10^{-6}$ E. M. U. per mol, and selected from the class consisting of nitroxides, phenazyls, and hydrazyls.

8. A composition comprising an organic polymeric material subject to deterioration and, in sufficient amount to retard such deterioration, an organic nitrogen compound, unreactive with oxygen at 20° C., of magnetic susceptibility between $500 \times 10^{-6}$ and $3400 \times 10^{-6}$ E. M. U. per mol, and having at least one unpaired electron.

9. A composition comprising an organic polymeric material subject to deterioration and, in sufficient amount to retard such deterioration, an organic nitrogen compound, unreactive with oxygen at 20° C., of magnetic susceptibility between about $1100 \times 10^{-6}$ and $3400 \times 10^{-6}$ E. M. U. per mol, and having at least one unpaired electron.

DAVID M. McQUEEN.

REFERENCES CITED

The following references are of record in the file of this patent:

UNITED STATES PATENTS

| Number | Name | Date |
|---|---|---|
| 2,529,512 | Ott | Nov. 14, 1950 |